United States Patent
Swaine

(10) Patent No.: US 8,966,309 B2
(45) Date of Patent: Feb. 24, 2015

(54) DISTRIBUTION OF AN INCREMENTING COUNT VALUE

(75) Inventor: Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 690 days.

(21) Appl. No.: 13/067,818

(22) Filed: Jun. 28, 2011

(65) Prior Publication Data

US 2012/0030499 A1    Feb. 2, 2012

(30) Foreign Application Priority Data

Jul. 30, 2010 (GB) .................................. 1012796.7

(51) Int. Cl.
   *H04L 12/56* (2006.01)
   *G06F 1/14* (2006.01)

(52) U.S. Cl.
   CPC ........................................ *G06F 1/14* (2013.01)
   USPC ........... 713/502; 703/400; 703/401; 703/500; 703/501; 703/503; 703/600; 703/601

(58) Field of Classification Search
   USPC .................. 713/400–401, 500–503, 600, 601
   See application file for complete search history.

(56) References Cited

U.S. PATENT DOCUMENTS

| 5,790,840 | A  |   | 8/1998  | Bulka et al. |
| 5,974,053 | A  | * | 10/1999 | Bennett et al. ................ 370/468 |
| 7,552,128 | B2 | * | 6/2009  | Bhalotia et al. ...................... 1/1 |
| 7,633,551 | B2 | * | 12/2009 | Sullivan ........................ 348/521 |
| 8,081,868 | B2 | * | 12/2011 | Choi .............................. 386/262 |
| 2002/0089602 | A1 | * | 7/2002 | Sullivan ........................ 348/500 |

OTHER PUBLICATIONS

GB Search Report for GB Application No. 1012796.7, dated Nov. 10, 2010.

* cited by examiner

*Primary Examiner* — M Elamin
(74) *Attorney, Agent, or Firm* — Nixon & Vanderhye P.C.

(57) ABSTRACT

Circuitry is disclosed that comprises: at least one element located within the circuitry and configured to hold an increasing count value; an encoder for receiving the increasing count value from a source of the increasing count value and configured to encode the increasing count value into encoded values, the encoded values each indicating an exponential amount to be applied to the count value held in the at least one element; interconnect circuitry for receiving the encoded value and transmitting the encoded value to the at least one element; wherein the at least one element comprises a decoder for decoding the encoded values and for increasing the count value in dependence upon the exponential amount.

21 Claims, 7 Drawing Sheets

| Log value | | Meaning to timestamp |
|---|---|---|
| 0 | ⇒ | set bit 0 |
| 1 | ⇒ | set bit 1, clear bit 0 |
| : | | |
| n | ⇒ | set bit n, clear bit n-1....0 | log value timestamp

0000

| | | |
|---|---|---|
| 0 | ⇒ | 0001 |
| 1 | ⇒ | 0010 |
| 0 | ⇒ | 0011 |
| 2 | ⇒ | 0100 |
| 0 | ⇒ | 0101 |
| 1 | ⇒ | 0110 |
| 0 | ⇒ | 0111 |
| 3 | ⇒ | 1000 |

FIG. 2

| log c | ts | | output logs | Reconstitute |
|---|---|---|---|---|
| 0 | 0001 | 1 | | |
| 1 | 0010 | 1 | 1 | 0010 |
| 0 | 0011 | 1 | | |
| 2 | 0100 | 1 | 2 | 0100 |
| 0 | 0101 | 1 | | |
| 1 | 0110 | 1 | | |
| 0 | 0111 | 1 | | |
| 3 | 1000 | 1 | 3 | 1000 |
| 0 | 1001 | 1 | | |
| 1 | 1010 | 1 | | |
| 0 | 1011 | 1 | 1 | 1010 |
| 2 | 1100 | 1 | | |

| timestamp | sync mark | log | sync tab | value stored |
|---|---|---|---|---|
| 100110 | start | | | 000000 |
| 100111 | 1 | 0 | 5 | 100000 |
| 101000 | 0 | 3 | 4 | 100000 |
| 101001 | 1 | 0 | 3 | 101000 |
| 101010 | 1 | 1 | 2 | 101100 |
| 101011 | 1 | 0 | 1 | 101110 |
| 101100 | 0 | 2 | 0 | 101100 |
| 101101 | end | | | |
| | start | | | |
| | 1 | | | | log > sync tab

FIG. 6

DISTRIBUTION OF AN INCREMENTING COUNT VALUE

This application claims priority to GB Application No. 1012796.7 filed Jul. 30, 2010, the entire contents of which are incorporated herein by reference.

FIELD OF THE INVENTION

The present invention relates to the field of distributing an incrementing count value across a circuit such that multiple copies of the count value are synchronised to within predetermined acceptable tolerances.

BACKGROUND OF THE INVENTION

In processing systems multiple components need to be synchronised for a variety of profiling and scheduling purposes. Likewise trace components that monitor the step by step activity of a processor need to have access to timing information that is consistent across the system so that ordering of detected events can be inferred.

These problems have been addressed with the use of timestamps. In processors designed by ARM® Ltd. of Cambridge UK the timestamp value used is a 64 bit value. Such a large value is selected to reduce the risk of it overflowing. This value needs to be available at different points in the system, and distributing a 64-bit value around a system is expensive in routing and challenging in implementation. As this value is used to indicate a time, the local copies of the value should be consistent with each other and thus, their delay in transmission should be similar. Additional problems arise in systems that have multiple clock and power domains. Transmitting an incrementing signal such as a timestamp signal across a clock domain boundary raises its own problems and while this can in theory be done using Gray codes, the resultant timestamp cannot be passed over a second clock domain boundary in the same way.

It would be desirable to be able to provide a system that could pass such an incrementing count value without such large routing overheads and with the ability to cross clock domain boundaries.

SUMMARY OF THE INVENTION

A first aspect of the present invention provides circuitry comprising: at least one element located within said circuitry and configured to hold an increasing count value; an encoder for receiving said increasing count value from a source of said increasing count value and configured to encode said increasing count value into encoded values, said encoded values each indicating an exponential amount to be applied to said count value held in said at least one element; interconnect circuitry for receiving said encoded value and transmitting said encoded value to said at least one element; wherein said at least one element comprises a decoder for decoding said encoded values and for increasing said count value in dependence upon said exponential amount.

The present invention recognises that transmitting a copy of an increasing count value across a circuit can have potential problems if this count value is to be a useful reflection of the current count value at its destination, and that this is particularly so if the value is itself quite large as this introduces significant routing problems. The present invention recognises that although an increasing count value may be represented by a large value the actual increase in the count value could be represented with far fewer bits. It also recognises that if an exponential amount is used to represent this increasing amount then the value transmitted can be encoded into relatively few bits and with the help of a decoder the local copy can be updated relatively easily.

In some embodiments, said maximum encoded value is smaller than said maximum count value, such that said interconnect circuitry can transmit said encoded value using fewer connections than would be required to transmit said count value.

Thus, by encoding the increasing count value as an exponential amount to be applied to the count value, a maximum encoded value can be used that is smaller than the maximum count value and thus, fewer routing connections are required to transmit this value.

In some embodiments, said decoder is configured to add said exponential value indicated by said received encoded value to said held count value.

Using an exponential value to encode the increasing amount is an efficient way to compress the value and the encoding and decoding can be performed in a number of ways. In one way the exponential value that represents an increase to the count value can be sent and this exponential value can simply be added to the copy of the count value.

In other embodiments, said decoder is configured to increment said held count value to a next multiple of said exponential value indicated by said received encoded value.

Alternatively, the exponential value can be used so that the count value is incremented to the next multiple of that exponential value. This is a particularly effective way of compressing the data.

In some embodiments, said count value comprises a binary value and said encoded value indicates an exponential amount to be applied to two, said decoder being configured to apply said encoded value as a power of two to determine a decoded value to be used to increase said count value.

It may be convenient if the count value is a binary value as many processing apparatuses use binary and if this is the case the exponential amount can be a power applied to two.

In some embodiments, said encoded value indicates a bit of said count value, said decoder being configured to increase said synchronised copy of said count value by setting said bit indicated by said encoded value and clearing all lower order bits.

A convenient and compression efficient way of encoding the increment is to transmit an encoded value which indicates a bit that is to be set, the decoder acting to set this bit and to clear all lower bits. Thus, if the encoded value is a 3, bit 3 is set to 1 and bits 2, 1 and 0 of the count value are cleared. Bit 4, 5, 6 etc remain unaffected by this updating.

In some embodiments, said circuitry comprises said count value source.

Although the count value may be received from external circuitry, in some embodiments the count value source is within the circuitry itself.

In some embodiments, said count value source comprises a timestamp generator for generating values representative of the passage of time, said at least one element holding a local copy of said timestamp.

Although the count value source can be a source of any increasing count value in some embodiments it is a timestamp generator that generates a value representative of the passage of time. This may be related to real time or may simply be related to increasing time. In many processing systems it may be important that a moment that something occurs can be related in one part of the system to another part of the system. Thus, it may be important that copies of say a timestamp synchronised to within an acceptable margin are available in different portions of the circuit so that one can determine an actual order that certain things occurred in different portions of the circuitry.

In some embodiments, said circuitry further comprises a plurality of elements and at least one splitter for splitting said signal received from said encoder into a plurality of signals and for outputting said plurality of signals via a plurality of interconnect circuitry to said plurality of elements, each of said plurality of elements comprising a decoder and holding said count value.

Embodiments of the present invention are particularly useful where there are several local copies of this count value. Transmitting these local copies to different places within the circuitry and maintaining them synchronised to within acceptable margins can have high routing requirements and be difficult from a timing point of view. Encoding the count value and transmitting a smaller bit signal helps address these problems.

In some embodiments said circuitry is configured such that said plurality of elements hold copies of said count value that are synchronised with each other to within a predetermined tolerance.

It should be noted that the copies are not generally synchronised with respect to the original timestamp source as it takes time to encode, decode and transmit them. However, the circuitry is configured so that the local copies are synchronised with respect to each other to within a predetermined tolerance.

In some embodiments, said interconnect circuitry comprises a plurality of buses.

Although the interconnect circuitry can take a number of forms, it is in many cases a plurality of busses.

In some embodiments, at least some of said circuitry comprises synchronous circuitry clocked by a clock signal, said circuitry having different clock domains, such that at least a portion of said synchronous circuitry is clocked by a clock signal at a different frequency to another portion, said circuitry comprising clock conversion circuitry arranged on said interconnect circuitry at a boundary between said differently clocked portions, said clock conversion circuitry comprising a data store configured to receive said encoded value from said interconnect circuitry operating in a first clock domain, to store said encoded value and to output said encoded value to said interconnect circuitry in a second clock domain.

A further problem in transmitting count values across a system is where parts of the systems operate in different clock domains. As a count signal often increments with respect to a clock signal portions operating in response to one clock signal can be difficult to relate to portions operating in response to a different clock signal.

This is addressed using clock conversion circuitry in embodiments of the present invention wherein a data store in the clock conversion circuitry receives the encoded value at a boundary between the clock domains and stores and then outputs it into the second clock domain.

Whether the clock is faster in the first or the second domain affects how the clock conversion circuitry treats the values.

Thus, when said second clock domain is operating at a faster clock frequency than said first clock domain, said data store is configured to receive and store an encoded value for each of said clock signals in said first clock domain and to output an encoded value from said data store for a subset of said clock signals in said second clock domain.

In the case of the second clock domain being faster than the first clock domain, the transmission of the signal is relatively simple. Provided that the receiving clock domain can deal with clock periods where no signal is sent then it simply receives the encoded value on a subset of the clock signals and updates it accordingly.

In the case where the second clock domain is operating at a slower clock frequency than the first clock domain it is slightly more difficult. In these embodiments said clock conversion circuitry comprises an additional store arranged at an input to said data store, wherein in response to said data store becoming full, which occurs when said second clock domain is operating at a slower clock frequency than said first clock domain, a next received encoded value is stored in said additional store, said circuitry comprising a comparator for comparing said next received value with a subsequently received value, said clock conversion circuitry being configured to determine which of said values would generate a higher increment in said count value and to input said value to said data store in response to said data store having a space and to discard the other of said values.

In cases where the second clock domain is operating a slower clock frequency than the first clock domain then the data store between the two clock domains will soon become full. Thus, in embodiments that can address this issue there is an additional data store provided and when the data store becomes full the circuitry is configured to store the next received value in the additional data store. This stored value is then compared with a next received value and when there is space in the data store between the two clock domains the higher of the two received values is transmitted and the other is discarded. In this way, only the value that triggers the higher increment in the count value is transmitted and thus, although a count value with the same resolution as that of the higher clock domain is not achieved, within the slower clock domain everything is operating at a lower frequency and thus, this lower resolution does not matter. The count value will be in line with the count values in the other clock domains, it will just be updating less frequently.

In some embodiments, said interconnect circuitry comprises a synchronising channel for carrying a synchronising signal to transmit a count value to said at least one element, said synchronising channel being configured to output a current value of said count value received from said count source over multiple cycles to said at least one element, said decoder being configured when not holding a current count value to commence synchronisation and to store at least a portion of said current value received on said synchronising channel.

The count value signal that is sent indicates an increase that can be applied to a value already held. Thus, it is not the entire count value that is transmitted. It may be that a portion of the circuit is turned off and that this portion holds the count value. In such a case when this portion is turned on again then the encoded values that contain the increase are not sufficient to re-establish the count value and it needs to be sent in a different way. Thus, for this reason, in some embodiments of the present invention there is a synchronising channel that carries a synchronising signal to synchronise the count values held in the plurality of elements. The synchronising channel outputs a current value of the count value received from the source, but in order for the synchronising channel not to be unduly wide, it transmits it over multiple cycles. The decoder is configured when it is not holding a current count value to commence synchronisation and to store the values received on the synchronising channel so that the current count value is received and stored.

In some embodiments, said current value of said count value outputs starting with the most significant portion.

It may be convenient to transmit this value serially and in such a case, it is advantageous to output the most significant portion first and to update the count value from this most significant portion.

In some embodiments, said decoder comprises a detector for detecting when a received encoded value indicates a change in count value of a bit in said count value of a higher or equal significance to a value received on said synchronising channel; said decoder being configured when synchronising to compare said received synchronising signal with a concurrently received encoded value and to store said received synchronising signal until said detector indicates that said received encoded value when applied to said count value will change a same or a higher bit than a bit said synchronising signal is currently outputting, whereupon said decoder is configured to apply said encoded value to update said count value and to continue updating said count value using said encoded value and to stop said synchronisation.

As the synchronising signal is sent over several cycles the count value is increasing while it is being sent. Thus, the decoder detects when a received encoded value indicates a change in count value of a bit in said count value of a higher or equal significance to a bit value received from said synchronising channel. When it detects this it stops synchronising and uses the encoded value to update the count value. The decoder is now in the steady state and can continue updating the count value using the encoded values which indicate the increments to be applied to the stored count value.

In some embodiments, said count value comprises a binary value and said encoded value indicates a power of two, said comparator comparing said encoded value with a bit position of said received synchronising signal and said at least one decoder being configured to apply said encoded value to said count value in response to said comparator indicating said encoded value is equal to or greater than said bit position of said received synchronising signal.

If the encoded values are binary values indicating a power of two then the comparator simply needs to determine when the encoded value is the same as or higher than the bit position of the received synchronising signal and synchronising can stop at this point.

In some embodiments, said encoder is configured continually to output on said synchronising channel a synchronise start signal followed by a serial version of a current count value.

The synchronising signal may be continually output and thus, when the decoder determines that it does not store a current count value and needs to synchronise it will await the synchronise start signal where upon it will start to store the count value that is being transmitted over several cycles.

Alternatively, in some embodiments the encoder is configured to output on said synchronising channel a synchronise start signal followed by a serial version of a current count value in response to a synchronise request.

It may be more convenient for the synchronisation signal to be sent in response to a request for it.

In some embodiments, said encoder is configured to output on said synchronising channel a synchronise start signal followed by a serial version of a current count value until said encoder determines said encoded value output when applied to said count value will change a same or a higher bit than a bit said synchronising signal is currently outputting, whereupon said encoder transmits said synchronising signal from said start signal.

Although the synchronising signal can be sent continually, as is noted previously, at a certain point the encoded value will be updating a more significant bit than is being sent by the synchronising signal and at this point the synchronising signal is no longer required. This information can be determined at the encoder and when it is determined that the synchronising signal is no more current than the encoding values the encoder can decide to terminate sending it and to start again. This reduces the average time taken for a decoder to synchronise to the current timestamp.

A second aspect of the present invention provides a method of updating an increasing count value held in at least one element, comprising: receiving said increasing count value from a source; encoding said increasing count value into encoded values, said encoded values each indicating an exponential amount to be applied to said count value held in said at least one element transmitting said encoded value to said at least one element via interconnect circuitry; decoding said encoded values and increasing said count value in dependence upon said exponential amount.

A third aspect of the present invention provides means for updating an increasing count value comprising: at least one means for holding said increasing count value; encoding means for receiving said increasing count value from a source of said increasing count value and for encoding said increasing count value into encoded values, said encoded values each indicating an exponential amount to be applied to said count value held in said at least one element; interconnecting means for receiving said encoded value and transmitting said encoded value to said at least one element; wherein said at least one means for holding said increasing count value comprises a decoding means for decoding said encoded values and for increasing said count value in dependence upon said exponential amount.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows how the encoded value can update the timestamp;

FIG. 6 shows the updating of the stored count value using the synchronising signal and the encoded value;

DESCRIPTION OF THE PREFERRED EMBODIMENTS

Figure 1:
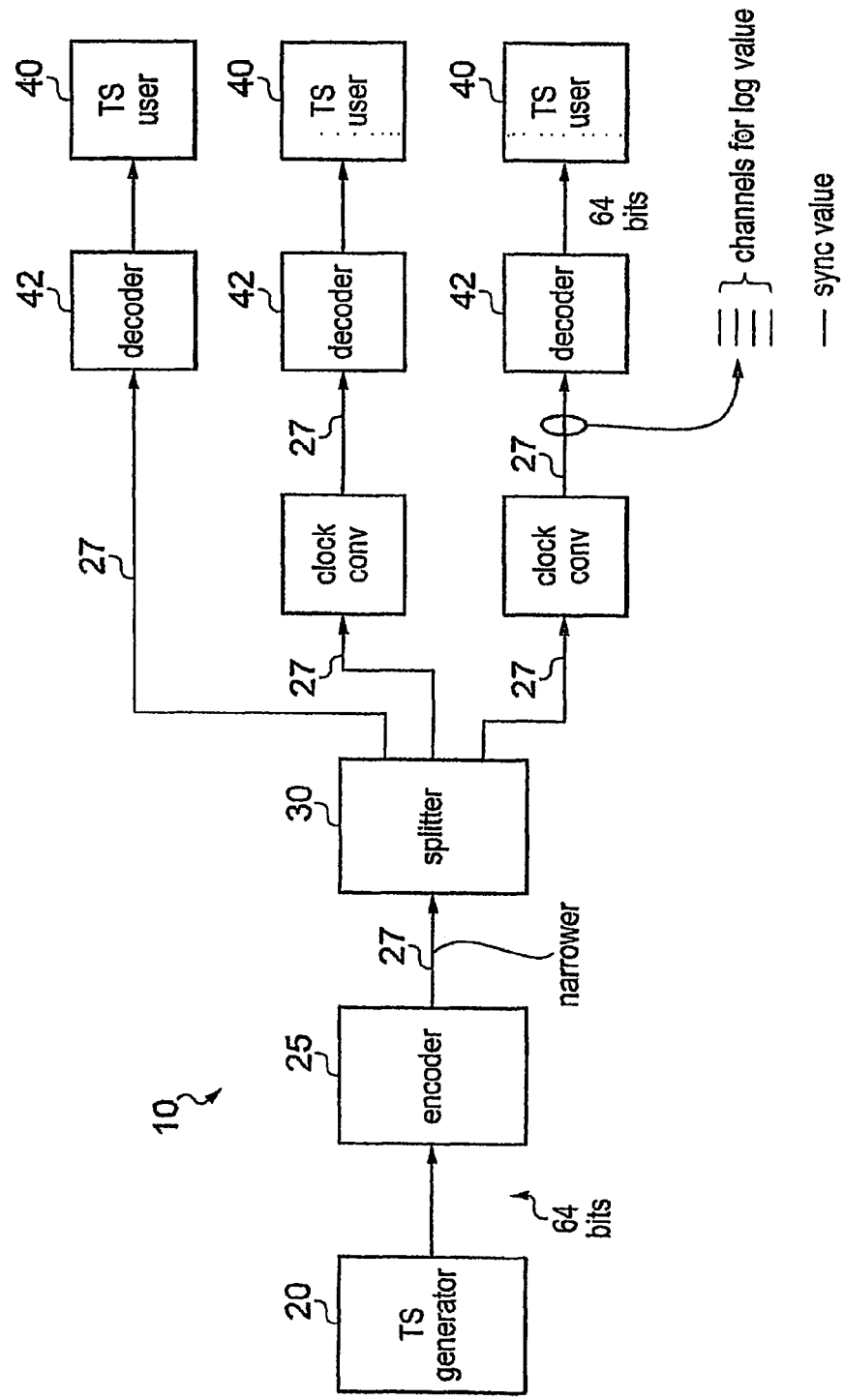
FIG. 1 shows circuitry for distributing a timestamp across a system according to an embodiment of the present invention.

FIG. 1 shows circuitry 10 for distributing a timestamp across a processing system such as a semiconductor chip. Circuitry 10 has a timestamp generator 20 that generates timestamp data. In this embodiment, this timestamp data is 64 bits wide, this width has been chosen to avoid the timestamp value overflowing during normal operation. As noted previously transmitting a 64 bit wide data value across a system is very challenging. To address this in this embodiment the 64 bit value is converted using an encoder 25 to a logarithmic value which indicates an increment that must be applied to the stored time value rather than the complete timestamp value. In this way, information within the timestamp can be transmitted with far fewer bits. This results in the value being transmitted using far narrower busses 27, than would be needed to transmit the entire timestamp value.

Once the timestamp value has been converted to its narrower logarithmic form a splitter 30 splits the signal into various channels, each of which are routed to a respective element 40 that holds a local copy of the timestamp that is output by the decoder 42. Decoder 42 decodes the encoded value to determine an increment that must be applied to a current value that it stores, it then updates this stored timestamp value with the increment and provides it to element 40. Element 40 does not in this embodiment store the value it simply uses it, the value is stored in decoder 42 and is output to element 40 on request when the timestamp is required. It should be noted that the local copies of the timestamps are not generally synchronised with the timestamp source as it takes several cycles to encode, decode and transmit the signal. However, they are arranged so that the different local copies are synchronised with respect to each other at least to within certain predetermined tolerances. Furthermore, the system will know the time taken for the timestamp to reach the local copies and thus, if the original value is required it can be calculated.

Thus, in this case if a 2 is received at the decoder the decoder sets bit 2 of the value stored in the timestamp store and clears the bit 0 and 1. This is described in more detail with respect to FIG. 2.

Thus, information that relates to an incrementing count value can be distributed across the system using far narrower busses than in the prior art and this allows the values to be updated faster and reduces the area requirements of the routing.

In this embodiment, the binary to logarithmic conversion has the following form. The value transmitted indicates the bit of a count value that is to be set and when this bit is set any lower bits are cleared.

FIG. 2 shows an example of how such an encoding can be used to increase a count value incrementally. Thus, if the log value is 0 this means set bit 0. If the log value is 1 it means set bit 1 and clear bit 0. If the log value is n it means set bit n and clear bit n−1 to 0.

Thus, an incrementing count can be transmitted using these much narrower log values. Thus, changing from 0 to 1 requires a log value of 0 which means set bit 0, changing from 1 to 2 i.e. 0b10 needs a log value of 1 which means set bit 1 and clear bit 0. Changing to 3, i.e. 0b11 requires a log value of 0 which means set bit 0 and changing to 4 which is 0b100 requires a log value of 2 which means set bit 2 and clear bits 0 and 1. Thus, as can be seen the incrementing count value can be transmitted in logarithmic form by simply indicating the bit that is to be set and clearing the bits underneath it.

Although, in this embodiment the logarithmic converter indicates a bit to be set and that the lower bits are to be cleared. Any exponential information can be sent to reduce the width of the data transmitted. Thus, the increment may be transmitted in exponential form and may then be added to the count value using an adder.

FIG. 1 also shows clock conversion means 50 which are located on clock domain boundaries. Many processing systems have regions that are clocked at different clocking frequencies. This may be done for power saving and performance reasons. Transmitting a timestamp value across these boundaries has its own challenges.

Figure 3:
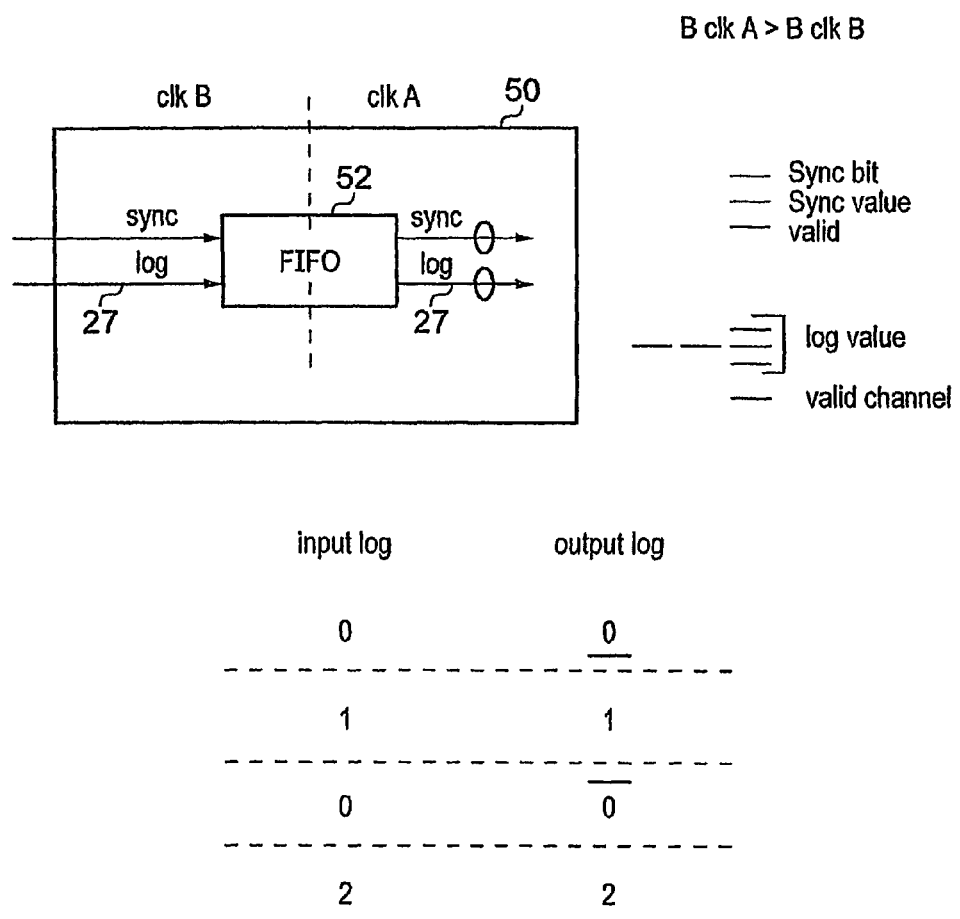
FIG. 3 shows clock conversion circuitry for transmitting the count value from a slower to a faster clock domain according to an embodiment of the present invention
Figures 4, 5:
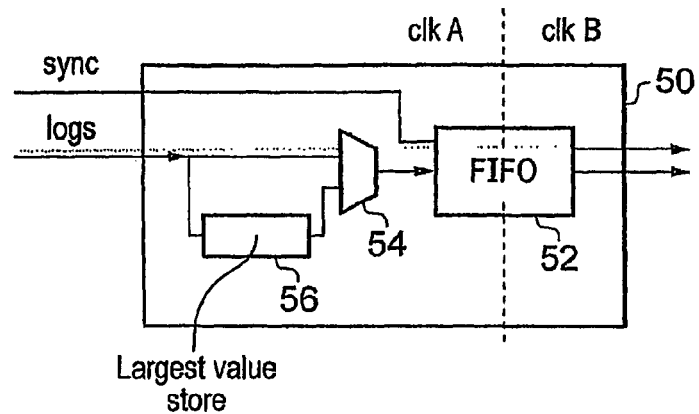
FIG. 4 shows clock conversion circuitry for transmitting the count value from a faster to a slower clock domain according to an embodiment of the present invention
FIG. 5 shows the timestamp travelling from the faster to the slower clock domain.

FIGS. 3 and 4 show in detail how the problem of an increasing and a decreasing clock frequency are addressed in embodiments of the present invention.

FIG. 3 shows clock conversion circuitry 50 on a boundary from a lower frequency domain to a higher frequency domain. There is a data store 52 in the form of a first in first out buffer FIFO arranged at the boundary. For each clock signal of the slower clock frequency, clock B an encoded logarithmic value is received at the FIFO and is stored in it. This stored value is then output at the faster clock frequency clock A. However there is not a value available for output from the FIFO at each clock signal of the faster clock frequency and thus, a valid signal is implemented on bus 27 and this valid signal is set to valid in response to a new value being stored in the FIFO and the valid signal is output on the valid channel and in response to this a stored value is output. In this way, a signal is only output on a subset of the clock A frequencies but this is acceptable as the signal is only changing at the slower speed and thus, outputting values any faster would not add anything to the resolution of the output signal. Thus, looking at the input logarithmic signal and the output signal, one has an input signal of 0 for a first input clock signal and an output signal of 0 for a first output clock signal, the next output clock signal outputs no value as no new input value has been received and thus, the valid signal was not enabled. At the next output clock signal a new input value has been received at the FIFO and this is a 1 and thus, a 1 is output and the output of values continues in this way.

While a dedicated valid signal is used in this embodiment, in an alternative embodiment a reserved encoding of the logarithmic signal is used instead. This reduces the number of wires required to route the logarithmic counts, at the cost of reducing by 1 the number of supported bits in the binary counter, for example from 64 bits to 63.

FIG. 4 shows a slightly more complicated example where the clock conversion is from a higher frequency domain to a lower frequency domain. In this case, the input signal is changing faster than it can be output. This is dealt with again by the use of a FIFO 52 at the clock boundary but also with the addition of a comparator 54 and a further data store 56. The received encoded values are stored in the FIFO 52 at the clocking frequency of clock A and are output from the FIFO at the clocking frequency of clock B initially. As clock B is slower than clock A the FIFO quickly becomes full and it is clear that this cannot continue. At this point, the next encoded value is stored in the further data store 56 and this is compared with the next value received. Comparator 54 then outputs the largest of these two values and the other value is discarded. Thus, when the FIFO is ready to receive a next value the value output by comparator 54 is sent to the FIFO. The store 56 is then cleared and the next value is stored and compared with the next received value. If there is no space in the FIFO at this point then the largest of the two values is stored in the data store 56 and the next value received and compared. In this way, whenever a space is available in the FIFO 52 the largest value that has been received during the time when the FIFO was full is then output to the FIFO. This generates an acceptable timestamp value for this slower clock domain as will be illustrated with respect to FIG. 5.

FIG. 5 shows an example of the logarithmic encoded value received, the corresponding timestamp value, and the values that are output from FIFO 52 into clock domain B. Thus, assuming the FIFO is full at the beginning a 0 and then a 1 are received before there is space in FIFO 52. As the 1 is the larger of the two values it is this that is output and thus, a reconstituted timestamp of 0b0010 is formed at this point. The next value to be received is a 0 and then a 2 before there is another output opportunity. Thus, as 2 is the larger of these two values this is output and the reconstituted timestamp becomes 0b0100. The next output opportunity occurs after 0, 1, 0 and 3 have been received and as 3 is the largest value a 3 is output to FIFO 52 and when output from the FIFO triggers a 0b1000 as the reconstituted timestamp. The next output opportunity occurs after a 0 and 1 have been received so the 1 is output through the FIFO 52 and thus the reconstituted timestamp becomes 0b1010. Thus, as can be seen timestamps in the slower clock domain are synchronised with those in the other clock domain at various points. They do not change as often but this is acceptable as the slower clock domain does not require such a fast changing timestamp and the resolution of this reconstituted timestamp is sufficient for the slower clock domain B.

This is an elegant solution to timestamps crossing time domain boundaries that requires little area overhead and yet produces a timestamp synchronised within an acceptable tolerance.

It should be noted that although FIGS. 3 and 4 have been shown as different circuitry for crossing different clock boundaries this has been done for ease of explanation. In many embodiments any clock boundary would simply be addressed using the circuitry of FIG. 4 and if the signals were travelling from a lower frequency domain to a higher frequency domain the FIFO 52 would simply never become full and thus, the additional data store 56 would not be needed. Using circuitry that can convert from either higher to lower or lower to higher means that the clock frequencies of these domains can change values, perhaps due to power considerations, and the system will still function correctly.

What has been described so far is how a timestamp is updated in response to an encoded logarithmic value. However, if a portion of the system that holds a local copy of a timestamp is powered down for performance reasons and is then powered up, the encoded incremental values will not be sufficient to reinstate the timestamp value. For this reason in embodiments of the present invention a synchronisation signal is sent to the various decoders, and this signal carries the timestamp value itself over several clock cycles.

Thus, with respect to FIGS. 1, 3 and 4 interconnect circuitry 27 has some additional channels that carry this synchronisation signal. In order to avoid having too many channels to send this signal, the synchronisation or sync signal is sent as a serial data signal along a single channel. Although the timestamp data may be sent along a single channel there are other additional sync channels that transmit additional synchronisation markers. The sync data signal is sent with the most significant bit first followed by other lower significant bits. These bits are received and are used to populate the stored local count value. At a certain point the encoded value is used to update this timestamp value and the way this point is calculated is described with respect to FIG. 6.

FIG. 6 shows how the sync signal is used to update a count value stored in a decoder 42 and output to a count value element 40 (of FIG. 1). Thus, at power up there is a 0 output from the decoder and the decoder recognises that the count value is not current and sends a sync request on the sync channels to the timestamp source. The timestamp source and encoder respond by sending a start synchronisation signal followed by synchronisation data. It should be noted that in this embodiment the decoder requests the synchronisation signal, while in other embodiments the synchronisation signal is sent continually along the synchronisation data channel and the decoder simply waits until it receives a start synchronisation signal indicating data is to be transmitted. This signal is in this embodiment sent along the synchronisation marker channel(s).

Once the start synchronisation signal has been detected the next bit indicates the most significant bit of the count value and this can be stored in the decoder and output to element 40. The next most significant bit is then sent and stored and so on. It should be noted that as the synchronisation signal takes several clock cycles to be transmitted, the timestamp itself is updating. However, the bits being output by the synchronisation signal are generally when they are output unchanged from the value the timestamp had when the synchronisation sequence started. The log value is used to update the timestamp value being written by the synchronising signal when it is appropriate so the most recent version of the count value can be used throughout the synchronisation sequence as will become clear below.

In this embodiment there is also a sync tab which indicates which bit of the sync data signal is currently being transmitted. This value is not transmitted, but is maintained separately by the encoder and by the decoders.

In the embodiment shown in FIG. 6 a 1 is sent after a start signal and this is stored as the most significant bit of the count value. At the same time the encoder is sending the update values to all of the decoders and in this example a 0 is received. This value is compared to the sync tab value (indicating the bit to be updated) and as it is less than the sync tab value the synchronisation continues. The next value to be received is a 0 and the encoded log value is a 3 and the sync tab value is 4, so the synchronisation signal is still updating a higher bit than the encoded log value so this 0 value, so the sync value is stored as the next significant bit. This continues until the encoded log value is higher or equal to the bit value of the sync tab. In this example this does not happen until the $0^{th}$ bit. At this point the log value is a 2 and thus, synchronisation ends and the encoded log value is taken by the decoder and used to update the value that is now stored. At this point synchronisation has stopped and the count value is updated from the log values.

In this embodiment the synchronisation data was sent in response to a sync request signal, in embodiments where there is no provision to send such a signal, the synchronisation signal may be continually sent along the synchronisation channels and be available for any of the plurality of decoders if they need synchronising following power down. The form of the synchronisation signal is generally a start flag and then the count value itself. Thus, the decoder simply needs to await the start flag and then start storing the synchronisation data. In some embodiments the encoder calculates when the current sync data being sent reaches a bit position that is equal to or lower than the bit position that the encoded value will update and at this point it recognises that synchronisation using the current synchronisation data will end and it stops sending this data and then sends a start signal and begins from the most significant bit again.

It should be noted that where there are synchronisation channels for transmitting the sync signals, where the timestamp signals cross clock boundaries then so must the sync signal cross the boundaries. In this case the sync signal cannot lose bits and have the same resolution in a lower clock domain and thus an additional valid signal is implemented which can be used to indicate when the FIFO on a clock boundary where the clock signal frequency is decreasing has space to accept the next bit of the synchronisation sequence. In this way, the synchronisation sequence is slowed to the speed of the slowest clock in the timestamp distribution system.

A particular implementation of the encoders and decoders outlined above is provided below:

Signals that are sent along the logarithmic count interface 27 include in embodiments of the present invention:

TSBITVALID (Master)

Valid signal for TSBIT. This will normally always be asserted by a timestamp generator, because it will count once per cycle. It might not always be asserted if the timestamp bus has been bridged into a faster clock domain.

TSBIT [5:0] (Master)

Valid if TSBITVALID is asserted.

If valid, it indicates a bit to be set on this cycle. The value indicates which bit in the timestamp should be set; all lower bits should be cleared. By setting and clearing bits in this manner, a binary counter is simulated.

The sequence (ignoring cycles where TSBITVALID is LOW) shall be: 0, 1, 0, 2, 0, 1, 0, 3, 0, 1, 0, 2, 0, 1, 0, 4 etc. This example sequence corresponds to the binary sequence 0 to 16.

TSSYNC[1:0] (Master)

This signal is encoded as follows:

0b00: No synchronization information is valid in this cycle.

0b01: Synchronization mark (see below).

0b10: Synchronization bit 0 (see below).

0b11: Synchronization bit 1 (see below).

TSSYNCREADY (Slave)

Stalls synchronization information on TSSYNC[1:0]. If this signal is LOW then the value of TSAUX[1:0] must either:

Be repeated on the next cycle.

Be changed to a synchronization mark. This will occur if a value of TSBIT[5:0] has been output that is equal to or greater than the bit position currently being output.

This signal does not stall TSBIT[5:0]. Slaves which cannot respond to TSBIT[5:0] immediately must discard smaller values and retain larger values.

Synchronization

Synchronization information is output over TSSYNC[1: 0]. This information is used when a component is powered up and needs to re-establish what the current timestamp is. The sequence is as follows:

1. A synchronization mark.
2. A sequence of synchronization bits corresponding to the current timestamp output from the most significant bit downwards.
3. The sequence of synchronization bits ends as soon as TSBIT[5:0] is equal to or higher than the bit position being output. A synchronization mark will be output on the same cycle that TSBIT[5:0] has this value.
4. The sequence synchronization bits starts again from (2).

Implementation

Encoder

The encoder 25 operates according to the following algorithm, in which TSVALUEB represents the 64-bit binary count:

```
synchronized = TRUE;
bit = 0;
last_TSSYNCREADY = 1;
last_TSVALUEB = 0;
on each cycle
    TSBITVALID = 0
    for i = 63 downto 0
        if TSVALUEB[i] != last_TSVALUEB[i] then
            TSBITVALID = 1;
            TSBIT = I;
            break;
    if TSBIT >= bit then
        synchronized = TRUE;
    if last_TSSYNCREADY then
        if synchronized then
            TSSYNC = 0b01;
            bit = 63;
            synchronized = FALSE;
        else
            TSSYNC[1] = 1;
            TSSYNC[0] = last_TSVALUEB[bit];
            bit = bit - 1;
    last_TSSYNCREADY = TSSYNCREADY;
    last_TSVALUEB = TSVALUEB;
```

TSSYNC is never 0b00, because the master is always capable of generating the next point in the synchronization stream.

TSVALUEB can increment at any speed—it does not need to increment in powers of 2, for example. This enables the clock speed to change while maintaining the same time value for each unit increment of the timestamp. In order to provide the greatest possible resolution, it will usually increment by a certain amount every cycle, causing TSBITVALID to always be high once the timestamp generator has been initialized.

Decoder

The decoder reconstructs the timestamp according to the following algorithm:

```
synchronizing = FALSE;
synchronized = FALSE;
TSVALUEB = 0;
bit = 0;
on each cycle
    TSSYNCREADY = 1;
    if synchronized then
        if TSBITVALID then
            TSVALUEB[TSBIT] = 1;
            if TSBIT != 0 then
                TSVALUEB[TSBIT-1:0] = 0;
    else
        if synchronizing then
            if TSBITVALID and (TSBIT >= bit) then
                synchronized = TRUE;
                TS VALUEB[TSBIT] = 1;
                if TSBIT != 0 then
                    TSVALUEB[TSBIT-1:0] = 0;
            else
                if TSSYNC[1] then
                    TSVALUEB[bit] = TSSYNC[0];
                    bit = bit - 1;
        else
            if TSSYNC = 0b01 then
                synchronizing = TRUE;
                bit = 63;
```

TSSYNCREADY is always asserted, because the slave does not need to pass TSSYNC values to another consumer.

Figure 7:
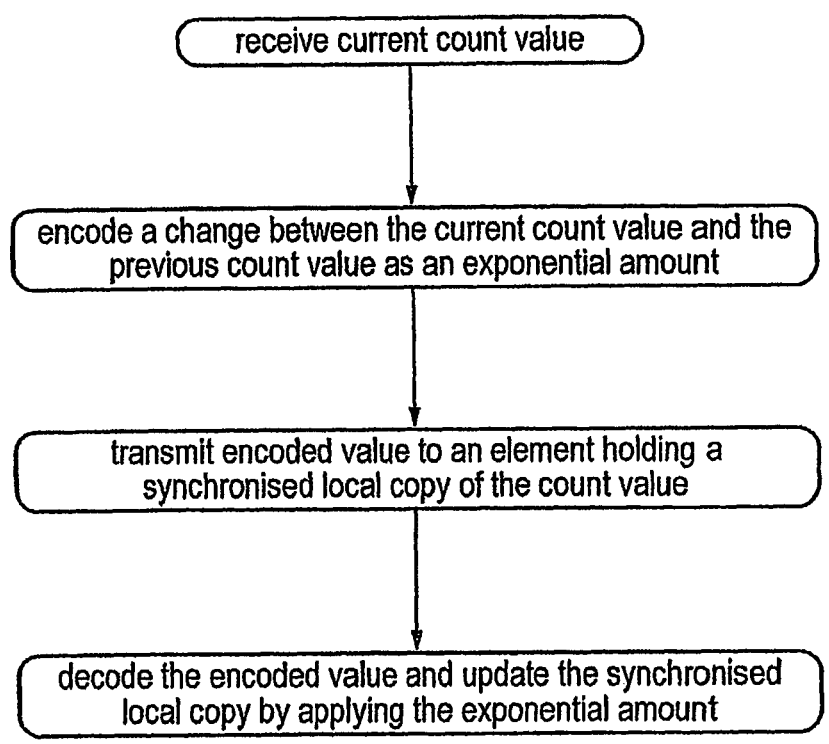
FIG. 7 shows a flow diagram illustrating steps in a method according to an embodiment of the present invention.

FIG. 7 shows a flow diagram illustrating a method of updating a local copy of a count value according to an embodiment of the present invention. Initially a current count value, is received and a change between the current count value and the previous count value is encoded as an exponential amount. This is then transmitted to an element that holds a local copy of a count value. This encoded value is decoded and the local copy is updated by applying the exponential amount and increasing the stored copy by the required quantity.

Figure 8:
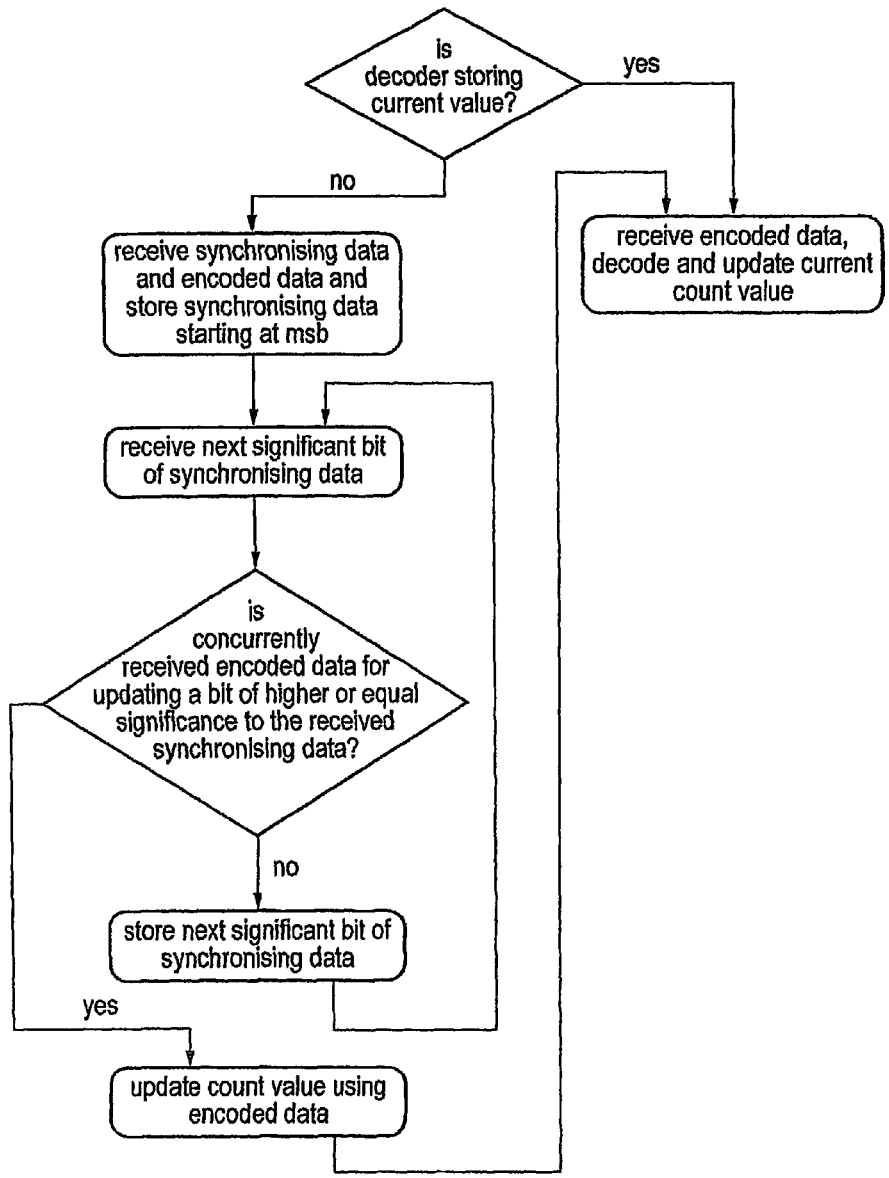
FIG. 8 shows a flow diagram illustrating method steps occurring at a decoder according to an embodiment of the present invention.

FIG. 8 shows a flow diagram illustrating a method occurring at the decoder that includes the possibility of updating the timestamp value following power down. Initially it is determined if the decoder is storing a current count value. It may not be storing a current count value if, for example, it has been powered down. If it is not storing a current value it needs to be synchronised. Thus, the decoder monitors the synchronising channel until it detects a synchronise start signal, whereupon it stores the next received value as the most significant bit of the current timestamp. The next significant bit of the synchronisation data is then received and the decoder determines whether the encoded data that is received concurrently is updating a bit of higher or equal significance to the received synchronisation data. If it is not then it stores this next significant bit of the synchronisation data and receives the subsequent bit. If the encoded value is updating a higher bit then it updates the count value using the encoded data that it decodes and as it is now synchronised it continues to update the count value with the encoded data Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Circuitry comprising:
at least one element located within said circuitry and configured to hold an increasing count value;
an encoder for receiving said increasing count value from a source of said increasing count value and configured to encode said increasing count value into encoded values, said encoded values each indicating an exponential amount to be applied to said count value held in said at least one element; and
interconnect circuitry for receiving said encoded value and transmitting said encoded value to said at least one element; wherein said at least one element comprises a decoder for decoding said encoded values and for increasing said count value in dependence upon said exponential amount, wherein at least some of circuitry comprising synchronous circuitry clocked by a clock signal, said circuitry having different clock domains, such that at least a portion of said synchronous circuitry is clocked by a clock signal at a different frequency to another portion, said circuitry comprising a clock conversion circuitry arranged on said interconnect circuitry at a boundary between said differently clocked portions, said clock conversion circuitry comprising a data store configured to receive said encoded value from said interconnect circuitry operating in a first clock domain, to store said encoded value and to output said encoded value to said interconnect circuitry in a second clock domain.

2. Circuitry according to claim 1, wherein said maximum encoded value is smaller than said maximum count value, such that said interconnect circuitry can transmit said encoded value using fewer connections than would be required to transmit said count value.

3. Circuitry according to claim 1, wherein said decoder is configured to add said exponential value indicated by said received encoded value to said held count value.

4. Circuitry according to claim 1, wherein said decoder is configured to increment said held count value to a next multiple of said exponential value indicated by said received encoded value.

5. Circuitry according to claim 1, wherein said count value comprises a binary value and said encoded value indicates an exponential amount to be applied to two, said decoder being configured to apply said encoded value as a power of two to determine a decoded value to be used to increase said count value.

6. Circuitry comprising:
at least one element located within said circuitry and configured to hold an increasing count value;
an encoder for receiving said increasing count value from a source of said increasing count value and configured to encode said increasing count value into encoded values, said encoded values each indicating an exponential amount to be applied to said count value held in, said at least one element;
interconnect circuitry for receiving said encoded value and transmitting said encoded value to said at least one element; wherein
said at least one element comprises a decoder for decoding said encoded values and for increasing said count value in dependence upon said exponential amount, wherein said count value comprises a binary value and said encoded value indicates an exponential amount to be applied to two, said decoder being configured to apply said encoded value as a power of two to determine a decoded value to be used to increase said count value, wherein said decoder is configured to increment said held count value to a next multiple of said exponential value indicated by said received encoded value; and
said encoded value indicates a bit of said count value, said decoder being configured to increase said synchronised copy of said count value by setting said bit indicated by said encoded value and clearing all lower order bits.

7. Circuitry according to claim 1, said circuitry comprising said count value source.

8. Circuitry according to claim 7, wherein said count value source comprises a timestamp generator for generating values representative of the passage of time, said at least one element holding a local copy of said timestamp.

9. Circuitry according to claim 1, said circuitry further comprising a plurality of elements and at least one splitter for splitting said signal received from said encoder into a plurality of signals and for outputting said plurality of signals via a plurality of interconnect circuitry to said plurality of elements, each of said plurality of elements comprising a decoder and holding said count value.

10. Circuitry according to claim 9, wherein said circuitry is configured such that said plurality of elements hold copies of said count value that are synchronised with each other to within a predetermined tolerance.

11. Circuitry according to claim 1, wherein said interconnect circuitry comprises a plurality of buses.

12. Circuitry according to claim 1, wherein when said second clock domain is operating at a faster clock frequency than said first clock domain, said data store is configured to receive and store an encoded value for each of said clock signals in said first clock domain and to output an encoded value from said data store for a subset of said clock signals in said second clock domain.

13. Circuitry according to claim 1, wherein said clock conversion circuitry comprises an additional store arranged at an input to said data store, wherein in response to said data store becoming full, which occurs when said second clock domain is operating at a slower clock frequency than said first clock domain, a next received encoded value is stored in said additional circuitry, said circuitry comprising a comparator for comparing said next received value with a subsequently received value, said circuitry being configured to determine which of said values would generate a higher increment in said count value and to input said value to said data store in response to said data store having a space and to discard the other of said values.

14. Circuitry according to claim 1, wherein said interconnect circuitry comprises a synchronising channel for carrying a synchronising signal to transmit a count value to said at least one element, said synchronising channel being configured to output a current value of said count value received from said count source over multiple cycles to said at least one element, said decoder being configured when not holding a current count value to commence synchronisation and to store at least a portion of said current value received on said synchronising channel.

15. Circuitry according to claim 14, wherein said current value of said count value is output starting with a most significant portion.

16. Circuitry according to claim 15, wherein
said decoder comprises a detector for detecting when a received encoded value indicates a change in count value of a bit in said count value of a higher or equal significance to a value received on said synchronising channel;
said decoder being configured when synchronising to compare said received synchronising signal with a concurrently received encoded value and to store said received synchronising signal until said detector indicates that said received encoded value when applied to said count value will change a same or a higher bit than a bit said synchronising signal is currently outputting, whereupon said decoder is configured to apply said encoded value to update said count value and to continue updating said count value using said encoded value and to stop said synchronisation.

17. Circuitry according to claim 16, wherein said count value comprises a binary value and said encoded value indicates a power of two, said comparator comparing said encoded value with a bit position of said received synchronising signal and said at least one decoder being configured to apply said encoded value to said count value in response to said comparator indicating said encoded value is equal to or greater than said bit position of said received synchronising signal.

18. Circuitry according to claim 14, said encoder being configured to continually output on said synchronising channel a synchronise start signal followed by a serial version of a current count value.

19. Circuitry according to claim 14, said encoder being configured to output on said synchronising channel a synchronise start signal followed by a serial version of a current count value in response to a synchronise request.

20. Circuitry according to claim 16, said encoder being configured to output on said synchronising channel a synchronise start signal followed by a serial version of a current count value until said encoder determines said encoded value output when applied to said count value will change a same or a higher bit than a bit said synchronising signal is currently outputting, whereupon said encoder transmits said synchronising signal from said start signal.

21. A method of updating an increasing count value held in at least one element, comprising:
receiving said increasing count value from a source;
encoding said increasing count value into encoded values, said encoded values each indicating an exponential amount to be applied to said count value held in said at least one element;
transmitting, using interconnect circuitry, said encoded value to said at least one element via interconnect circuitry;
decoding said encoded values and increasing said count value in dependence upon said exponential amount, said above method steps are implemented on a computer processing system comprising synchronous circuitry clocked by a clock signal, said circuitry having different clock domains, such that at least a portion of said synchronous circuit is clocked by a clock signal at a different frequency to another portion, said circuitry comprising a clock conversion circuitry arranged on said interconnect circuit at a boundary between said differently clocked portions, said clock conversion circuitry comprising a data store configured to receive said encoded value from said interconnect circuit operating in a first clock domain, to store said encoded value and to output said encoded value to said interconnect circuitry in a second clock domain.

* * * * *